Patented Dec. 16, 1947

2,432,634

UNITED STATES PATENT OFFICE 2,432,634

CRACKING HYDROCARBON OIL WITH SILICA-MAGNESIA CATALYST

Charles L. Thomas, Chicago, Ill., assignor to Universal Oil Products Company, Chicago, Ill., a corporation of Delaware No Drawing. Application August 14, 1939, Serial No. 290,071

15 Claims. (Cl. 196—52)

This invention relates to the conversion of hydrocarbon fractions produced in distilling petroleum oils and especially those of a distillate character which are vaporizable without substantial decomposition.

In a more specific sense the invention is concerned with a modification of hydrocarbon oil conversion processes involving the use of particular and specific types of catalysts which function selectively to promote the formation of a relatively high yield of high quality gasoline and gases containing a substantial proportion of polymerizable olefins.

The art of cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, the knowledge of what catalysts to employ when cracking different fractions from different petroleums is largely empirical and admits of no generalizations. A large number of the catalysts developed for cracking have a tendency to accelerate reactions leading to the formation of gas rather than of gasoline, this being particularly evidenced by reduced metal catalysts such as nickel or iron and many of such catalysts are sensitive to sulfur poisoning and are quickly coated with carbonaceous materials which render them practically inert. This deposition of carbonaceous materials is many times related to the type of decomposition reactions selectively fostered by the catalyst and in general it may be said that very few, if any, catalysts which have been tried thus far in cracking reactions have reached a commercial status. The present invention is concerned with the use of catalytic materials which are specially adapted to accelerate the cracking of heavy fractions of petroleum and other hydrocarbonaceous materials to increase the rate of production of gasoline-boiling range fractions. The preferred catalysts are characterized by selectivity in accelerating gasoline-forming reactions rather than gas-forming reactions, by their refractory character which enables them to retain their catalytic properties through many repeated periods of use and reactivation under severe conditions of temperature, and by their ease and simplicity of manufacture and their exact reproducibility.

In one specific embodiment the present invention comprises a process for producing gasoline by subjecting higher boiling hydrocarbon oils at a temperature in the approximate range of 350–650° C. to contact with a granular catalytic material comprising a mass formed by calcining an alkali metal-free composite of a major proportion of precipitated silica hydrogel and a minor amount of precipitated magnesia hydrogel.

In the following specification the terms "silica" and "magnesia" are used in a broad sense. Inasmuch as the chemical knowledge of the solid state has not been developed perfectly, it is not possible to give the structure of all solid substances, and all that can be said definitely concerning the silica-magnesia masses is that they contain silicon, oxygen, and magnesium. Generally speaking, however, the oxides mentioned show more or less low catalytic activity individually but display high activity in the aggregate. This activity is not an additive function as it is relatively constant for a wide range of proportions of the components, whether they are present in molecular or fractions of molecular proportions. Neither component can be determined as the component for which the other may be considered as the promoter according to conventional terminology, nor can one component be determined as the support and the other the catalyst proper.

According to the description of the preparation of the preferred catalysts given hereinafter, precipitated magnesia hydrogel is composited with silica hydrogel and then the composite is washed, dried, formed into particles and calcined at a temperature in the appropriate range of 500–875° C.; while alternatively the composite may be washed, formed into particles, dried and then calcined to produce catalytic particles which in general have a total water content of less than 5% by weight. However, the different catalysts which may be so produced may not necessarily give equivalent results.

According to the present invention the heavier distillate fractions of petroleum are cracked at a temperature in the order of 350–650° C. and at substantially atmospheric pressure or at an increased pressure while in contact with catalyst produced preferably by precipitating magnesia hydrogel upon the relatively pure salt-free silica hydrogel, followed by washing to remove the water soluble salts and then drying to remove a major portion of the combined or adsorbed water. A superatmospheric pressure of up to approximately 70 atmospheres may also be employed for the cracking of such hydrocarbon distillates using a hydrocarbon distillate feed rate corresponding to a liquid space velocity in the approximate range of 0.1–50.

In the finished catalysts prepared as indicated above, the weight ratio of silica to magnesia may vary within a considerable range. As a rule catalyst composites having choice activity based on yields and quality of gasoline, and the production of readily polymerizable gaseous olefins may contain as high as 50% by weight of magnesia. The silica content of the finished catalyst may be greater than 65% by weight of the total composite, the remainder of about 35% or less being magnesia. These proportions of silica and magnesia will vary considerably with the particular hydrocarbon fractions subjected to catalytic cracking and with the degree of conversion desired in any particular case.

It is to be recognized that very little is known positively concerning the mechanism of enhanced activity of complex catalysts and no attempt will be made herein to offer any definite reasons for the observed mutually promotional effects of silica with magnesia composites prepared for catalytic cracking purposes according to the present invention. There may be a catalytic effect due to the juxtaposition of the catalyst components and it may be that the magnesia is the more active catalyst and is dispersed extensively in and on the silica in order to present a large surface.

In manufacturing the preferred catalysts in accordance with the present process it is necessary to employ silica which has been prepared by precipitation from solution as a hydrogel with or upon which magnesia is deposited also by precipitation as a hydrogel. A convenient method of preparation of a satisfactory silica gel is to acidify an aqueous solution of sodium silicate by the addition of the required amount of hydrochloric acid. The excess of acid and the concentration of the solution in which the precipitation is brought about will determine the eventual primary activity of the silica and its suitability for compositing with the magnesia hydrogel to produce a catalyst of high activity. In general, the most active silica is produced by adding only enough acid to cause gel formation to occur in the sodium silicate, but the material formed at such a point is rather gelatinous and is filtered with difficulty. Further, the silica hydrogel is coagulated incompletely at this point. By adding a moderate excess of acid after the hydrogel has formed, the more desirable physical characteristics in regard to catalyst activity are conserved, while the "filtrability" is generally improved and the silica hydrogel is precipitated more completely. Fairly good hydrated silica for present catalytic purposes may be made by employing as high as a 20% excess of hydrochloric acid, but beyond this point the more desirable properties are damaged. After precipitating the silica gel it is preferably washed until substantially free from salts by using several alternative reagents, which will be described later.

In one mode of preparing the active catalyst, the silica hydrogel, prepared by precipitation from sodium silicate solution followed by washing, is mixed with a solution of a magnesium salt and then a volatile basic precipitant such as ammonium hydroxide, is added. Alternatively, slurries of precipitated hydrogels of silica and magnesia may be combined, then dried, formed into particles, and calcined to yield an active catalyst.

As a further alternative method of producing the desired catalysts, a magnesium salt such as the chloride, nitrate, acetate, or sulfate dissolved in water may be mixed with a solution of an alkali metal silicate, or other water soluble silicate, to jointly precipitate hydrogels of silica and magnesia. A characteristic equation illustrating the preparation of a silica-magnesia composite catalyst is given below, although in it no account is taken of water of hydration:

$$Na_2SiO_3 + MgCl_2 \rightarrow 2NaCl + MgO + SiO_2$$

It will be obvious that the employment of the reaction shown in the above equation will be limited on account of the molal proportions involved so that such a method of preparation of a composite may need supplementing by the presence of acid for further precipitation of silica to obtain the desired ration. Thus the precipitation of silica hydrogel may be accomplished by a combination of magnesium salt and acid. The order of addition of magnesium salt and acid may be varied, or they may be mixed simultaneously with the sodium silicate solution. Likewise the sodium silicate solution may be added to the mixed solution of the acid and magnesium salt, or in the production of catalyst composites containing relatively high proportions of magnesia hydrogel, a mixture of sodium silicate and alkali, as ammonium hydroxide solution, may be mixed with a solution of a magnesium salt.

It is not sufficient to precipitate magnesia hydrogel on such natural siliceous materials as powdered quartz or diatomaceous earth however finely divided these materials may be. Silica of some value has been obtained by the hydrolysis of silicon tetrachloride, although that obtained similarly from silicon tetrafluoride was decidedly inferior.

In the preparation of active silica hydrogels from soluble silicates, a series of experiments has further indicated that hydrochloric acid is the best common material to use as a precipitant, although sulfuric acid and other acids give but slightly inferior results. The precipitation is best conducted at approximately normal temperature since tests conducted at temperatures of the order of 95° C. gave a silica gel which was inferior as a component of a silica-magnesia composite as measured by the gasoline produced when it was used as a cracking catalyst.

If alkali metal salts are present in sufficient quantities in either the originally precipitated silica gel or in the final catalyst composites, catalysts are obtained which are not sufficiently active under the usual cracking conditions. If present in smaller quantities, catalysts may be obtained which are active in the early stages of use but lose their activity during the elevated temperatures reached in regeneration by the burning off of carbonaceous deposits in a stream of air or of other oxygen-containing gas. Catalysts which contain still less alkali metal compounds may be heated up to 815–875° C. during calcination and regeneration without loss of activity. For these reasons special washes are preferably used which are capable of removing these alkali metal compounds from the catalyst so that only quite minute amounts remain, since it has been found that these alkali metal ions cannot be washed out by water alone. The washes developed are dilute hydrochloric acid, and solutions of ammonium chloride and magnesium chloride which serve to displace the alkali metal compounds in the catalyst so that additional water washing can remove the alkali compounds. For economic reasons hydrochloric acid seems to be preferable to ammonium chloride and also because ammonium chloride seems to be slightly inferior in its effectiveness.

Catalysts prepared for the process by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that catalysts may be reactivated and reused for long periods of time.

According to the present process catalysts prepared by the general procedure described in the preceding paragraphs are utilized to the best advantage as reactor filling materials in the form of small pellets or granules. In the majority of cases wherein hydrocarbon fractions readily vaporizable at moderate temperatures without extensive decomposition are employed, the average particle size is within the approximate range of 6–10 mesh (approximately 3.3–1.6 mm.), which may apply either to small pellets of uniform size and short cylindrical shape or to particles or irregular size and shape produced by the grinding and sizing of the partially dehydrated materials.

While the simple method of preheating a given fraction of hydrocarbon oil vapors to a temperature suitable for their cracking in contact with the catalysts and then passing the vapors over a stationary mass of catalyst particles contained in a cylindrical chamber (preferably vertical) may be employed in some cases, it is usually preferable to pass the preheated vapors through banks of relatively small diameter catalyst-containing tubes in multiple connection between headers, since this arrangement of apparatus is better adapted to permit exterior heating of the catalyst tubes to compensate for the heat loss in the endothermic cracking reactions. The catalysts may also be utilized in the form of powder which is mixed with the oil and passed through reactors under conditions of temperature, pressure, and time adequate to give substantial yields of gasoline.

After the passage of the oil vapors over the catalyst, the products may be separated into heavy residual materials unsuitable for further cracking on account of their coke-forming tendencies, intermediate insufficiently converted fractions amenable to further catalytic cracking, gasoline boiling range materials and fixed gases, the intermediate fractions being returned directly to admixture with the charging stock so that ultimately there is a complete recycling of the unconverted fractions and maximum utilization of the cracking stock for gasoline production.

As the activity of the catalyst for producing gasoline decreases with use and is highest when fresh or freshly reactivated, this invention is carried out preferably by utilizing cracking reactors in duplicate so that the cycle of operation may consist of alternate periods of cracking and of reactivation by burning off the carbonaceous deposits in an atmosphere of an oxygen-containing gas. Powdered catalyst which has become spent by use may be withdrawn from and reactivated outside of the cracking system, after which it may be returned to the cracking reactors with the oil undergoing conversion.

The present process besides being characterized by the use of novel catalysts of relatively long life is further characterized by the production of good yields of high antiknock gasoline and the formation of gases containing substantial proportions of polymerizable olefins.

In the cracking of petroleum distillates such as gas oil at a temperature of the order of 350–650° C. the liquid space velocity employed in the range of 0.5–50 is adjusted to the cracking temperature used in order to produce a relatively high yield of gasoline with a low formation of gas and small deposition on the catalyst of carbonaceous material. The time a given catalyst is used before reactivation varies with the operating conditions and the rapidity of carbon deposition. Catalysts which have lost activity in use because of the deposition thereon of carbonaceous materials are reactivated at the cracking temperature by treatment with air or other oxygen-containing gas during which time the catalyst temperature may increase above the temperature normally used for cracking because of the heat of combustion of the carbonaceous material. After reactivation, the catalyst has approximately the same activity for promoting cracking as when fresh.

The following examples of the use of catalysts peculiar to the present invention are given to indicate the novelty and utility of the present process, although not with the purpose of limiting the invention in exact agreement with the data introduced.

*Example 1*

For use in the preparation of the preferred catalyst silica hydrogel was obtained by adding dilute hydrochloric acid to a sodium silicate solution until the latter was acid to litmus. The mixture was filtered and the filter cake was washed with dilute hydrochloric acid, distilled water, a mixture of dilute hydrochloric acid and ammonium chloride, and again with water. Four hundred fifty parts by weight of this silica hydrogel, corresponding to one molar proportion of silica, was suspended in 4500 volumes of water. To this suspension was added 566 parts by weight (2.78 molar proportions) of magnesium chloride hexahydrate dissolved in 1000 volumes of water. Then 1400 volumes of concentrated ammonium hydroxide solution was added to precipitate magnesia hydrogel upon the silica hydrogel producing a suspension which was separated from the aqueous solution by filtration. The filter cake was dried at 150° C., then pressed, ground and screened to produce 6–10 mesh granules which were calcined at 500° C. and then rescreened.

100 volumes of the granular catalyst so prepared was used as a filler in a reaction tube through which Pennsylvania gas oil of 37.3° A. P. I. gravity was passed at 500° C., and later in other runs at 525° C. under atmospheric pressure for six hours at a liquid space velocity of 4. Under these conditions, as shown in Table 1, approximately 20% yields of gasoline of 75–76 octane number were obtained.

TABLE 1

*Cracking of Pennsylvania gas oil in the presence of silica-magnesia catalyst*

| | | | |
|---|---|---|---|
| Furnace temperature, °C | 500 | 500 | 525 |
| Gasoline: | | | |
| Volume percent of charge | 23.3 | 19.0 | 20.9 |
| Octane number | 75.7 | 74.5 | 75.7 |
| Gas, weight per cent of charge | 2.8 | 2.0 | 3.9 |
| Potential polymer gasoline from the gas, weight per cent of charge | 1.6 | 1.1 | 1.7 |

In addition to the yields of gasoline indicated in Table 1 the gaseous products formed simultaneously contained substantial proportions of propene and butenes convertible by polymerization in the presence of a catalyst into polymer gasoline equal to 1.1–1.7% by weight of the gas oil charged.

Example 2

Four hundred fifty parts by weight of water glass, corresponding to 2.5 molecular proportions of silica, was dissolved in 6000 volumes of water. To this solution was added a solution of 450 parts by weight (2.5 molecular proportions) of magnesium chloride hexahydrate dissolved in 1000 volumes of water. The slurry of silica and magnesia hydrogels so formed by precipitation was filtered and the filter cake was slurried in 5000 volumes of water and filtered to wash the water soluble impurities from the hydrogel mixture. This washing procedure was performed five times and the resulting filter cake was slurried in 5000 volumes of water to which a small amount of magnesium chloride solution had been added. The slurried mixture was filtered, the filter cake was water washed three times, and then the purified hydrogel was dried at 150° C. The resulting powdered catalyst was formed into 6–10 mesh granules, which were calcined at 500 and 760° C., and then used in cracking runs on Pennsylvania gas oil at 500 and 550° C. under atmospheric pressure using a liquid space velocity of 4 during periods of 6 hours each. The yields of gasoline and gas obtained in these runs are shown in Table 2.

TABLE 2

*Cracking in the presence of silica-magnesia catalyst*

| Experiment No. | 1 | 2 | 3 | 4 |
|---|---|---|---|---|
| Furnace temperature, °C | 500 | 500 | 500 | 550 |
| Calcination Temperature of catalyst, °C | 500 | 500 | 760 | 760 |
| Gasoline: | | | | |
|   Volume per cent of charge | 23.9 | 25.0 | 21.0 | 23.7 |
|   Octane number | 77.2 | 77.6 | 78.0 | 77.0 |
| Gas, Weight per cent of charge | | 4.8 | 2.8 | 7.4 |
| Potential polymer gasoline from the gas: | | | | |
|   Weight per cent of charge | | 2.9 | 1.7 | 3.5 |

From comparison of the results shown above for experiments 2 and 3 it is apparent that a higher yield of gasoline and less gas resulted when using a catalyst which had been calcined at 500° C. rather than a similar catalyst calcined at 760° C. In these different runs the gasoline yields were in the range of 21–25%.

The character of the present invention and its novelty and utility can be seen from the preceding specification and numerical data presented, although neither section is intended to be unduly limiting in its generally broad scope.

I claim as my invention:

1. A process for converting a hydrocarbon distillate heavier than gasoline into substantial yields of gasoline which comprises subjecting said distillate at a temperature of the approximate order of 350–650° C. to contact with an alumina-free composite of silicon and magnesium oxides resulting from calcining a mixture of precipitated silica hydrogel and a minor amount of precipitated magnesia hydrogel.

2. A process for converting a hydrocarbon distillate heavier than gasoline into substantial yields of gasoline which comprises subjecting said distillate at a temperature of the approximate order of 350–650° C. to contact with an alumina-free composite of silicon and magnesium oxides resulting from separately precipitating silica hydrogel by acidifying an aqueous solution of an alkali metal silicate, washing said hydrogel to remove substantially all impurities, adding thereto a minor proportion of a magnesia hydrogel produced by adding an alkaline precipitant to an aqueous solution of a magnesium salt and purifying by washing to remove water soluble salts, heating the composite to remove a major portion of the combined water, and calcining said composite at a temperature in the approximate range of 500–875° C.

3. A process for converting a hydrocarbon distillate heavier than gasoline into substantial yields of gasoline which comprises subjecting said distillate at a temperature of the approximate order of 350–650° C. to contact with an alumina-free composite of silicon and magnesium oxides resulting from separately precipitating silica hydrogel by acidifying an aqueous solution of an alkali metal silicate, washing said hydrogel to remove substantially all impurities, adding the purified silica hydrogel to an aqueous solution of a magnesium salt, precipitating a magnesia hydrogel in an amount whereby the magnesia is less than 50% by weight of the catalyst composite by the addition of a basic precipitant, filtering and washing the suspended material to remove water soluble salts, heating the composite to remove a major portion of the combined water, and calcining said composite at a temperature in the approximate range of 500–875° C.

4. A process for converting a hydrocarbon distillate heavier than gasoline into substantial yields of gasoline which comprises subjecting said distillate at a temperature of the approximate order of 350–650° C. to contact with a granular catalyst resulting from adding a solution of a magnesium salt to a solution of an alkali metal silicate in proportioned amounts to produce a partial precipitation of silica hydrogel and complete precipitation of magnesia hydrogel, adding sufficient acid to precipitate further amounts of silica hydrogel so that the silica in the finished catalyst composite is greater than 65% by weight of the total composite, filtering the suspended material, washing with solutions of ammonium chloride to replace substantially all alkali metals by ammonium, further washing with water to remove substantially all water soluble salts, and heating the composite to remove a major portion of the combined water, and calcining said composite at a temperature in the approximate range of 500–875° C.

5. A process for converting a hydrocarbon distillate heavier than gasoline into substantial yields of gasoline which comprises subjecting said distillate at a temperature of the approximate order of 350–650° C. to contact with an alumina-free granular composite of silicon and magnesium oxides resulting from separately precipitating silica hydrogel, adding thereto a minor portion of magnesia hydrogel, heating the composite to remove a major portion of the combined water, and further heating said composite at a temperature in the approximate range of 500–875° C. to reduce the total water content to below 5% by weight thereof.

6. A process for converting a hydrocarbon distillate heavier than gasoline into substantial yields of gasoline which comprises subjecting said distillate at a temperature of the approximate order of 350–650° C. to contact with an alumina-free composite of silicon and magnesium oxides resulting from separately precipitating silica hydrogel by acidifying an aqueous solution of an alkali metal silicate, washing said hydrogel to remove substantially all impurities, adding thereto a minor proportion of a magnesia hydrogel produced by adding an alkaline precipitant to an aqueous solution of a magnesium salt and purifying by washing to remove water soluble salts, heating said composite to remove a major portion of the combined water, and calcining said composite at a temperature in the approximate range of 500–875° C.

7. A process for producing gasoline of high anti-knock value which comprises subjecting hydrocarbon oil to conversion conditions in the presence of an alumina-free composite of silicon and magnesium oxides resulting from calcination of a mixture of precipitated silica hydrogel and precipitated magnesia hydrogel.

8. A conversion process which comprises subjecting hydrocarbon oil heavier than gasoline to cracking conditions in the presence of an alumina-free composite of silicon and magnesium oxides resulting from calcination of a mixture of a major proportion of precipitated silica hydrogel and a minor proportion of precipitated magnesia hydrogel.

9. A method of cracking petroleum oil which comprises contacting the oil to be cracked at cracking temperature with a catalyst consisting essentially of activated silica produced by drying and heating an association of undried silica hydrogel with magnesia, the amount of magnesia being about 35% of the composition on a dry basis, and maintaining said oil in contact with said catalyst for a period of time sufficient to obtain the desired cracking thereof.

10. A method of cracking petroleum oil which comprises contacting the oil to be cracked at cracking temperature with a catalyst consisting essentially of activated silica produced by drying and heating an association of undried silica hydrogel with magnesia, the amount of magnesia being a minor proportion of the composition on a dry basis, and maintaining said oil in contact with said catalyst for a period of time sufficient to obtain the desired cracking thereof.

11. A conversion process which comprises contacting hydrocarbon oil under cracking conditions with a catalyst consisting essentially of a dried and heated mixture of a major proportion of silica hydrogel and a minor proportion of magnesia hydrogel.

12. A conversion process which comprises contacting hydrocarbon oil under cracking conditions with a catalyst consisting essentially of a dried and heated mixture of silica hydrogel and magnesia, the silica content of said catalyst being in excess of 65% by weight.

13. The method as defined in claim 10 further characterized in that the final catalyst contains silica in an amount greater than 65% by weight of the total composite.

14. The process as defined in claim 1 further characterized in that the calcined composite contains more than 65% by weight of silica, the remainder being magnesia.

15. The process as defined in claim 8 further characterized in that the calcined composite contains more than 65% by weight of silica, the remainder being magnesia.

CHARLES L. THOMAS.

REFERENCES CITED

The following references are of record in the file of this patent:

UNITED STATES PATENTS

| Number | Name | Date |
|---|---|---|
| 1,728,732 | Jaeger | Sept. 17, 1929 |
| 1,840,450 | Jaeger et al. | Jan. 12, 1932 |
| 2,229,353 | Thomas et al. | Jan. 21, 1941 |
| 2,283,172 | Bates | May 19, 1942 |

FOREIGN PATENTS

| Number | Country | Date |
|---|---|---|
| 103,678 | Australia | Apr. 7, 1938 |
| 484,368 | Great Britain | May 4, 1938 |
| 504,614 | Great Britain | Apr. 24, 1939 |
| 820,917 | France | Aug. 9, 1937 |